United States Patent [19]

Adell

[11] Patent Number: 4,677,790

[45] Date of Patent: * Jul. 7, 1987

[54] DOOR EDGE GUARD

[75] Inventor: Robert Adell, Sunnyvale, Tex.

[73] Assignee: U.S. Product Development Company, Sunnyvale, Tex.

[*] Notice: The portion of the term of this patent subsequent to Jun. 4, 2002 has been disclaimed.

[21] Appl. No.: 835,917

[22] Filed: Mar. 4, 1986

[51] Int. Cl.⁴ .................................................. E05F 7/00
[52] U.S. Cl. .......................................... 49/462; 52/716
[58] Field of Search ............................. 49/462; 52/716

[56] References Cited

U.S. PATENT DOCUMENTS 4,443,508  4/1984  Mehl ............................... 49/462 X
4,520,594  6/1986  Adell ................................... 49/462

Primary Examiner—Kenneth Downey
Attorney, Agent, or Firm—Rhodes and Boller

[57] ABSTRACT

An edge guard for the trailing edge of a swinging closure comprises a metal strip formed into a general U-shaped so as to have inner and outer legs of single thickness extending from a semi-circular base. Non-metallic insulating material is applied to the metal strip so as to be disposed in covering relation to at least certain portions of the strip including a covering relation which prevents the metal of the channel from contacting the trailing edge. Some non-metallic material is applied to the metal strip at locations where the legs apply self-retention force to the trailing edge and has a higher durometer than at other locations where non-metallic material is applied to the metal channel. In the preferred embodiment the higher durometer material also covers the distal end edge surfaces of the legs.

14 Claims, 20 Drawing Figures 4,677,790

DOOR EDGE GUARD

BACKGROUND AND SUMMARY OF THE INVENTION

This invention relates to edge guards of the type which are applied to the trailing edges of swinging closures in automobiles, commonly referred to as door guards or door edge guards.

Many of applicant's patents relate to door edge guards of the self-retaining metallic type. Such edge guards are desirable because they provide superior characteristics for protection, appearance, and retention without the use of any separate fastening devices. Over more recent years applicant has developed insulated door edge guards of the self-retaining metallic type in which a non-metallic insulating material is cooperatively associated with the metal channel forming the door edge guard so that the metal of the door edge guard is insulated from the metal of the edge on which the edge guard is installed. This insulating feature enables such door guards (and the door's edges, too) to maintain their appearance and functional characteristics longer by minimizing the risk of development of problems which might otherwise occur when a dissimilar metal of the door edge guard is directly installed on the painted metal edge. The nature of these improvements is explained in detail in a number of applicant's patents and will not be repeated here in the interest of brevity.

While most of applicant's patents involve door edge guards in which a bead is formed at the distal end of one or both of the legs of the metal channel by reverse turning the distal end or ends back against the leg or legs, it is possible for a door edge guard to be constructed which does not have any beads so formed. While the formation of such beads results in a preferred product because of the increased strength and gripping power imparted to the legs, applicant has heretofore recognized that for certain uses a door edge guard whose legs consist solely of a single thickness of the metal channel can perform reasonably satisfactory, although such a product is deemed not as good as one having beaded distal ends formed by reverse turning.

Applicant's concept of utilizing single thickness metal legs for a self-retaining door edge guard channel goes back at least as early as his application Ser. No. 216,483 filed Dec. 15, 1980, abandoned in favor of pending continuation Ser. No. 575,430 filed Jan. 31, 1984.

Applicant's inventions also comprise the use of extrusion and co-extrusion processes to fabricate door edge guards, as disclosed in his pending allowed application Ser. No. 636,880, filed Aug. 2, 1984. According to the inventions of those processes a flat metal strip is processed through an extrusion or co-extrusion line which imparts plastic insulating material selectively to the metal strip. The metal strip is then coiled, while still in the flat, for subsequent processing by roll-forming apparatus which imparts the desired cross sectional shape to the strip thereby forming the door guard. One of the advantages of these processes is that different colored plastics may be extruded or co-extruded onto the metal strip and the metal wound into particular colored coils which can be stored and then subsequently uncoiled as required in order to provide desired colors for various specific door guards.

The present invention relates to an improvement in a door guard of the type which has single thickness metal legs, particularly relating to an improvement in an insulated metal edge guard. One aspect of the invention involves utilizing insulating material to impart a strengthening and protective characteristic to the door guard so that single thickness metal legs can have an improved gripping characteristic, while taking advantage of the process described in Ser. No. 636,880. This aspect of the invention is accomplished in the preferred embodiment by co-extruding onto the side edges of metal strip, plastic which has a higher durometer and greater thickness than the rest of the insulation so that in the finished product the higher durometer and thicker plastic is disposed at the distal ends of the legs and may be considered somewhat equivalent to beads formed by reverse turning the distal ends of the edge guard legs back against themselves.

Various embodiments of the invention are disclosed. The invention can be practiced with insulation on the interior of the metal edge guard channel and/or on the exterior of the channel, although it is preferred that there always be insulation on the interior so as to provide protection between the metal of the edge guard channel and the painted metal edge on which the edge guard is installed. Insulation on the exterior can provide desired coloration.

The foregoing features, advantages, and benefits of the invention can be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
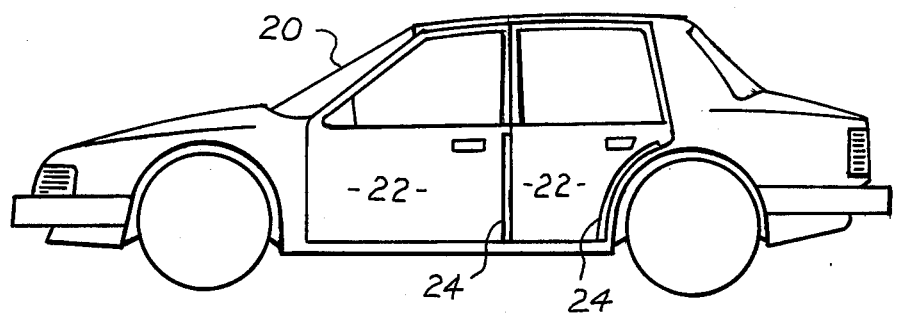
FIG. 1 is a side elevational view of an automotive vehicle containing door edge guards embodying principles of the invention.

FIG. 1 illustrates an automotive vehicle 20 having doors 22 on whose trailing edges are disposed door edge guards 24 embodying principles of the present invention. Each door edge guard is conformed to the contour of the trailing edge on which it is installed, and is of the self-retaining insulated metal type.

FIGS. 2, 2A, 2B, and 2C, illustrate a sequence of steps in a process of fabrication of edge guards 24. These steps embody the method disclosed in the above referenced allowed application Ser. No. 636,880. A flat metal strip 26 of appropriate thickness, width, and composition is conducted through a processing line and treated in an appropriate manner, including insulating material being selectively applied to it. A representative insulating material is plastic which is applied via conventional extrusion and/or co-extrusion apparatus.

FIGS. 2, 2A, 2B, and 2C illustrate a sequence of steps with reference to a particular selective application of plastic to the metal strip. It will be appreciated that this particular application is merely representative for purposes of illustration. It results in an edge guard product shown in FIG. 3. Other of the drawings illustrate other edge guard products which may be created by particular selective applications of insulation to metal strip.

Figure 2A:
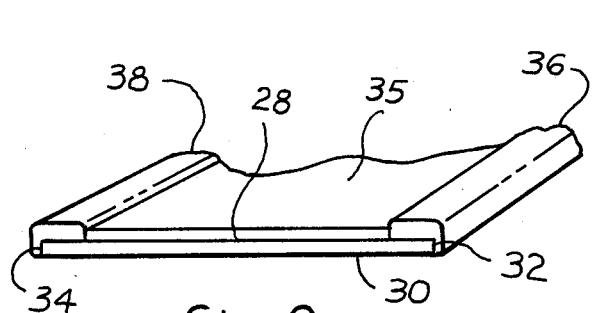
FIGS. 2, 2A, 2B, 2C are fragmentary end perspective views of various steps in the fabrication of a representative door edge guard of the present invention.
Figure 2B:
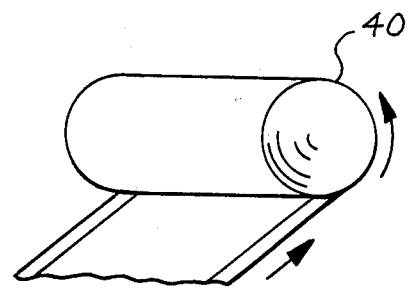

FIG. 2A illustrates selective application of insulating material to the flat metal strip. For purposes of explanation, the flat metal strip may be considered to comprise major facial surfaces 28 and 30, and side edge surfaces 32 and 34. Hence in cross section the metal strip has a generally rectangular shape. In the example illustrated by FIG. 2A insulating material is applied in covering relation to the surfaces 28, 32 and 34, with these surfaces being completely covered by insulating material. The insulating material is applied by extrusion or co-extrusion processes.

The majority of surface 28 is covered by a central zone 35 of insulating material while additional zones of insulating material 36 and 38 are applied in covering relation to the margins of surface 28 and the side edge surfaces 32 and 34. The particular insulating materials utilized may be of any suitable composition, but polyvinylchloride (PVC) is presently a preferred material for its extrudability, cost, appearance, and other factors; it is to be appreciated, however, that other materials may be utilized.

An important aspect of the invention is that the insulating material zones 36 and 38 are characterized by a relatively high durometer insulating material. This durometer is higher than that of the insulating material in central zone 35. The purpose in making the zones 36, 38 of a higher durometer is to attempt to enhance the effectiveness of the gripping action of the legs of the edge guard in the finished edge guard product as will more fully hereinafter appear.

The product shown in FIG. 2A is suitably processed after the extrusion or co-extrusion of the insulating material zones to arrive in a stable condition where it can be wound into a coil 40 as depicted in 2B. The coil 40 forms a supply of insulated flat strip material which can then be uncoiled as shown by FIG. 2C and processed through a roll forming apparatus 42 to form a finished edge guard product 44. The roll forming apparatus is conventional and serves to form the flat strip material into the desired cross sectional shape which is preferably a U-shaped cross section as appears in FIG. 3.

This particular edge guard product 44 comprises a U-shaped cross section having a semi-circular base 46 from which extend inner and outer legs 48 and 50 respectively. The surface 30 of the metal strip becomes the exterior of the U-shaped metal channel forming the edge guard and therefore desirably is of a material which possesses a suitable appearance characteristic. For example, stainless steel provides a characteristic of bright shiny metal. Other materials however may be utilized.

Figure 2:
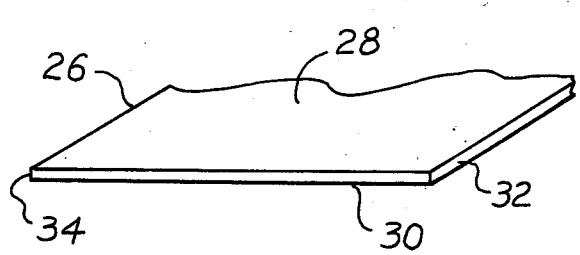
Figure 2C:
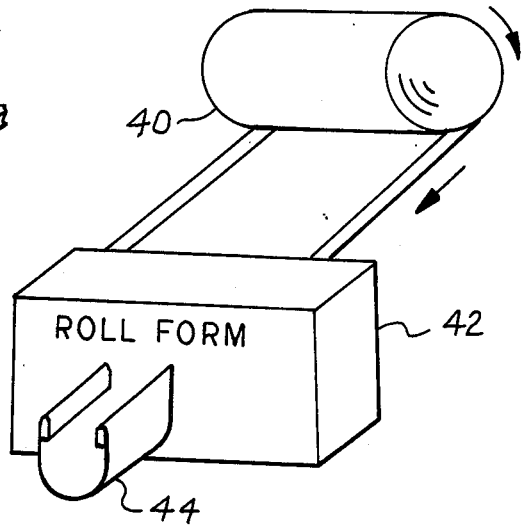

The metal 26 also has a resilient character whereby when the edge guard is fitted onto the trailing edge of a swinging closure, such as the doors 22 in FIG. 2, the legs 48 and 50 bear against opposite sides of the edge thereby providing the self-retention force. In this regard the edge guard is so dimensioned in relation to the edge of the swinging closure onto which it is to be installed that the resilient self-retention action will take place. In other words the throat opening across the edge guard will typically be slightly less than the thickness of the edge onto which the edge guard is to be installed.

Figure 3:
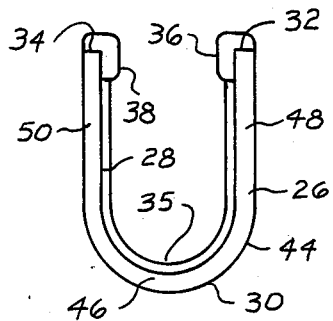
FIG. 3 is a transverse end view of a door edge guard resulting from the steps depicted in FIGS. 2, 2A, 2B, 2C.

It is to be observed that the product illustrated in FIG. 3 comprises the inner and outer legs 48 and 50 of the metal channel being of the same thickness as the metal strip. In other words there are no formations in the legs such as curved bends or reversely turned distal end edges. Accordingly a relatively simple roll-forming procedure is used, as distinguished from roll-forming procedures which may be utilized to impart curved bends and/or reversely turned distal end edges to the strip during the roll-forming process.

Looking at FIG. 3 it is to be observed that the zones of insulating material 36 and 38 are in covering relation to the distal end edges of the legs of the metal channel formed by the side edge surfaces 32 and 34 of the strip, as well as the immediately contiguous portions of the metal on the interior of the cross section. When the edge guard is installed on the edge of the swinging closure it is these latter portions of the zones of insulating material 36 and 38 which bear against opposite sides of the edge. By making these zones of insulating material of a relatively high durometer and by virtue of their initmate bonding to the metal which occurs through the preferred use of the coextrusion or extrusion steps, the high durometer plastic material may impart an improved stiffening and gripping characteristic to the legs in a manner somewhat analogous to the use of reverse turning of the distal end edges of the legs back against themselves and/or the impartation of curved bends to the legs. In general, the gripping characteristic will not be as good as with these other procedures, but there may be certain uses where there is sufficient gripping power to make this type of a product acceptable for commercial use. As noted, it does not involve as complicated a roll-forming procedure because all that is necessary is to roll form the strip into the U-shaped cross section without performing any additional operations on the legs.

By providing the zone of insulating material 35 in covering relationship to the remainder of surface 28 which is not covered by the zones 36, 38 it is insured that the full interior of the metal channel is insulated from the metal of the painted edge onto which the edge guard is to be installed. This additional zone of insulating material 35 possesses a different characteristic from the characteristic of the zones 36 and 38. Since the purpose of zone 35 is mainly to provide for insulation of the metal, rather than to perform a leg stiffening and/or improved gripping function, it may be of a lower durometer and less thickness than the zones 36, 38, by way of example. Hence by making the zone of material 35 thinner than the thicknesses of the zones 36, 38, less material is used, yet adequate insulation is achieved.

The covering of the metal by the zones 36 and 38 in the manner shown is also advantageous in that it may possibly eliminate the need to do any processing on the side edge surfaces 32, 34 of the metal strip itself. In other words, the side edge surfaces of the metal strip, which are typically slit, are protectively covered by the higher durometer material 36, 38 so that additional procedures such as beading, rounding off, or coining of the edges of the metal strip may not be necessary. It is to be understood however that principles of the invention may be practiced on metal strip having such beaded, rounded off, or coined edges.

The use of vinyl material for the insulating material makes it susceptible to a desired coloration. Thus, for example the embodiment shown in FIG. 3 in which the exterior of the edge guard is basically a bright metallic appearance provided by the surface 30 of the metal strip, the zones 36 and 38 could be colored with a metallic appearance so that the exposed portion of insulation at the distal ends of the legs would closely match that of the metal. However, by making the plastic material of any desired color, various color coordination schemes may result.

Figure 4:
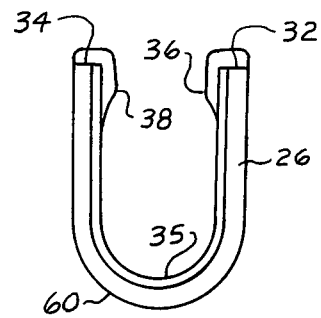
FIGS. 4–17 are views similar to FIG. 3 of various embodiments of door edge guards.

FIG. 4 illustrates a further embodiment of edge guard 60 which is like the preceding embodiment 44 of FIG. 3 except that the zone of insulating material 35 is applied to the full extent of surface 30 before the zones 38 and 36 are applied. Consequently the portions of the zones 38 and 36 which bear against the door edge overlap the side marginal portions of the zone 35.

Figure 5:
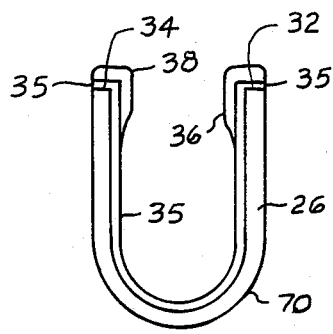

FIG. 5 illustrates a still further embodiment 70 in which the central zone of material 35 has been extended to include the edge surfaces 32 and 34.

Figure 6:
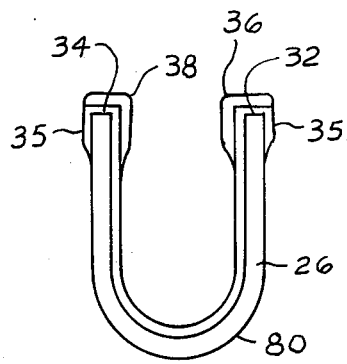

FIG. 6 illustrates an embodiment 80 in which the central zone 35 has been still further extended so that a portion is disposed to overlie the side margins on the exterior. By making the material constituting zone 35 of a desired coloration, various color coordination schemes may result as viewed from the exterior. By making the color a contrast to the metal of the strip, a colored contrasting band may appear along the exterior of the legs which is wider than would be the case for embodiments 44, 60 and 70 if their insulation were color-contrasting.

Figure 7:
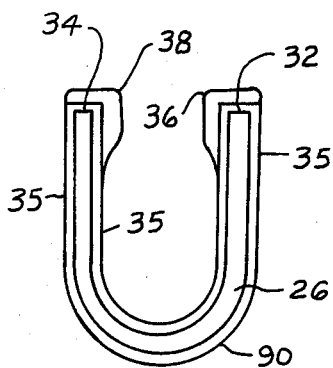
Figure 8:
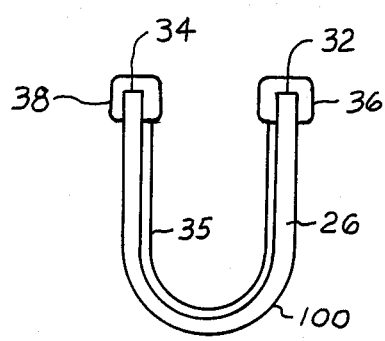
Figure 9:
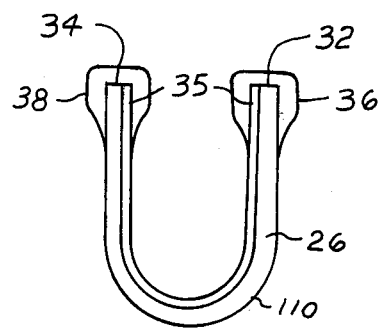
Figure 10:
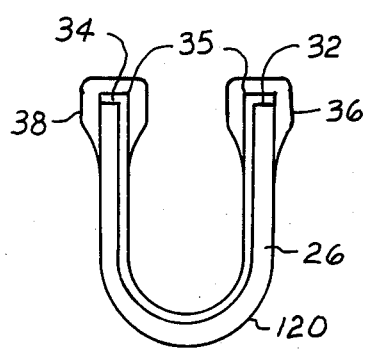
Figure 11:
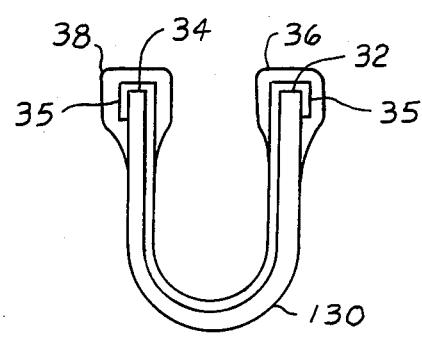
Figure 12:
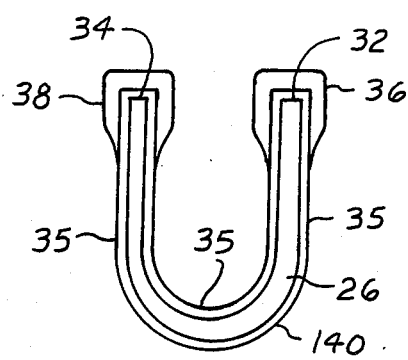
Figure 13:
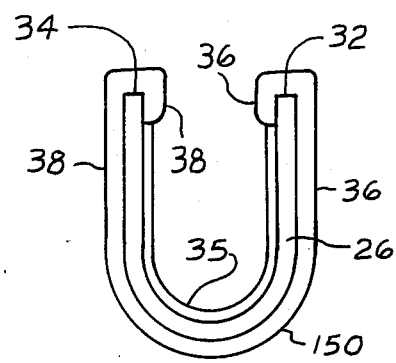
Figure 14:
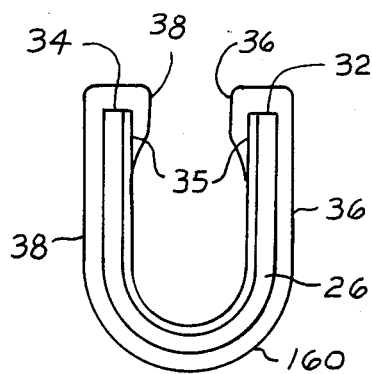
Figure 15:
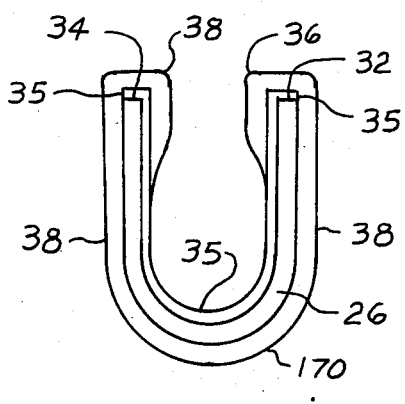
Figure 16:
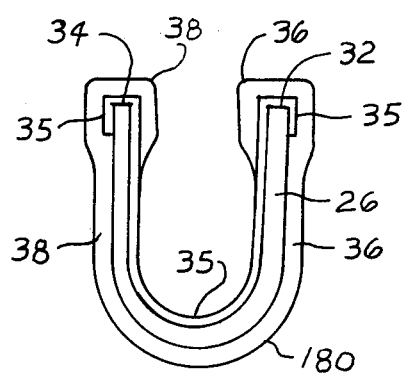
Figure 17:
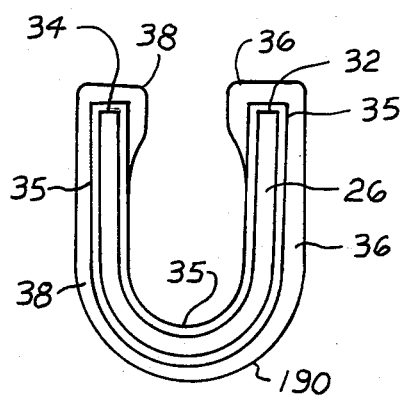

FIG. 7 is a view of a still further embodiment 90 in which the entirety of the cross section of the metal strip 26 has been covered with the material of zone 35 prior to the application of the zones 38 and 36. In this way a desired coloration of the material for zone 35 may produce a desired color appearance on substantially the entirety of the exterior of the cross section. By making the zones 38 and 36 of the same color as zone 35 a uniform appearance may result. However, by making them of a contrasting color from zone 35, different color coordination schemes may result. The use of a full encapsulation of the metal as in embodiment 90 may be advantageous for enabling a lower cost material to be used for the metal strip since the metal will impart no appearance on the exterior where the material 35 is non-transparent.

Because each edge guard is cut to length at its ends, these ends may be left bare, or else they may be covered by any suitable form of a covering medium such as plastic, paint, etc. and these media may be applied by any of several conventional procedures such as extruding, dipping, spraying, or the like. These media would typically be applied to an edge guard product after it has been cut to length and conformed to any desired contour for the particular edge onto which it is to be installed.

FIGS. 8, 9, 10, 11 and 12 represent further embodiments of respective edge guards 100, 110, 120, 130, and 140. These embodiments 100, 110, 120, 130, 140 correspond respectively in a certain way to the embodiments 44, 60, 70, 80 and 90. The embodiments 100, 110, 120, 130 and 140 differ however in that the zones 36, 38 extend to also cover the immediately adjacent margins of the exterior of the cross section at the distal ends of the legs. An advantage of this arrangement is that a further enhanced leg stiffening function may be accomplished by the zones 36, 38 because there is stiffening material on both sides of the distal end of each leg. Likewise various color coordination schemes may be created in an analogous manner to the color coordination schemes previously described.

FIGS. 13, 14, 15, 16 and 17 depict still further embodiments of edge guards 150, 160, 170, 180 and 190 respectively. These embodiments correspond to the embodiments of FIGS. 8, 9, 10, 11 and 12 and are similar thereto except for the fact in the embodiments of FIGS. 13-17 the zones 36, 38 are extended to cover the full exterior of the cross section. Hence, the external appearance will be determined by the particular characteristics of the zones 36, 38. These embodiments may provide a further enhanced leg stiffening function.

It is to be appreciated that the illustrations shown in the several drawing figures are representative for purposes of illustrating principles of the invention. In the extrusion or co-extrusion of plastic onto metal strip there is a certain degree of control which can be exercised in controlling the thickness and shape of the resulting cross section. The corners of the plastic insulating material are illustrated in the several drawing figures with some rounding and feathering to simulate an actual product. It is to be understood that the drawing figures are not necessarily to scale and that the relative proportions are not necessarily those which would exist in an actual product; rather the drawings serve to portray principles of the invention. In general the nominal thickness of insulation will be less than the metal thickness. Typically, the higher durometer zones of plastic will be thicker than the lower durometer zones. A representative durometer for the harder zones may be on the order of 120 while the lower durometer zones may be on the order of 40, by way of example.

The various embodiments depicted in FIGS. 4-17 are preferably fabricated in the same manner described in connection with the fabrication of embodiment 44 of FIG. 3, with reference to FIGS. 1, 2, 2A, 2B and 2C. In other words it is preferable that the zone of material 35 first be applied to the metal and then the zones 36 and 38.

While a preferred embodiment of the invention has been disclosed it will be appreciated that principles are applicable to other embodiments.

What is claimed is:

1. In combination with the trailing edge of a swinging closure, a self-retaining insulating metal edge guard fitted onto said trailing edge comprises an elongate metal channel having in transverse view inner and outer legs extending from a generally semi-circular base, said inner and outer legs serving to apply self-retention forces to opposite sides of said trailing edge, said channel being formed from a metal strip of uniform thickness having side edge surfaces which become distal end edge surfaces of the legs in the channel, non-metallic insulating material disposed on the metal channel in covering relation to said legs and base including a covering relation wherein direct contact of the metal of the channel with said trailing edge is prevented by said non-metallic insulating material, said non-metallic insulating material having respective zones, one of said zones being on one leg at the location of force application by that leg to said trailing edge, another of said zones being on the other leg at the location of that other leg's force application to the trailing edge, and a further of said zones disposed on the channel between said one and said another zones wherein said one and said another zones are of harder non-metallic insulating material than said further zone of non-metallic insulating material.

2. The combination set forth in claim 1 in which said one and said another zones of non-metallic insulating material are disposed on the metal channel so that the force applied to the trailing edge by each leg is transmitted through the corresponding one of said one and said another zones.

3. The combination set forth in claim 1 in which said one and said another zones of non-metallic insulating material also extend in covering relation to the distal end edge surfaces of the respective legs.

4. The combination set forth in claim 1 in which said one and said another zones are disposed in covering relation to the distal end edge surfaces of the respective legs and immediately contiguous marginal portions of the interior and the exterior of each respective leg.

5. The combination set forth in claim 1 in which said one and said another zones each partially overlaps a corresponding portion of said further zone.

6. The combination set forth in claim 5 in which said one and said another zones partially overlap said further zone at the distal end edge surfaces of the respective legs and an immediately adjacent marginal portion of the respective legs.

7. The combination set forth in claim 1 in which said non-metallic insulating material is so disposed as to cover the full exterior of the metal channel.

8. The combination set forth in claim 7 in which said insulating material which covers the full exterior of the metal channel is constituted by the extension of said one and said another zones in covering relation to the exterior of the metal channel.

9. The combination set forth in claim 1 in which said legs are generally parallel with each other.

10. In combination with the trailing edge of a swinging closure, a self-retaining insulated metal edge guard comprising an elongate metal channel having in transverse view inner and outer legs extending from a generally semi-circular base, said inner and outer legs serving to apply self-retention forces to opposite sides of said trailing edge, said channel being formed from a metal strip of uniform thickness having side edge surfaces which become distal end edge surfaces of the legs in the channel, non-metallic insulating material disposed on the metal channel in covering relation to said legs and base including a covering relation wherein direct contact of the metal of the channel with the trailing edge is prevented by said non-metallic insulating material, said non-metallic insulating material having respective zones, one of said zones being in covering relation to the distal end edge surface of one of said legs and an immediately contiguous side of the same leg, another of said zones being in covering relationship to the distal end edge surface of the other leg and an immediately contiguous side of the same leg, said non-metallic insulating material having a further zone disposed on the metal channel between said one and said another zones, and wherein said one and said another zones are of non-metallic insulating material which is of higher durometer than that of said further zone of insulating material.

11. The combination set forth in claim 10 in which the material of said one and said another zones extends from the corresponding distal end edge surface onto immediately contiguous margins of each leg on both the interior and the exterior of the channel.

12. The combination set forth in claim 11 in which said one and said another zones are extended on the interior of the channel so as to cover the full exterior of the channel.

13. The combination set forth in claim 10 in which said one and said another zones of non-metallic insulating material partially overlaps respective portions of said further zone of non-metallic insulating material.

14. The combination set forth in claim 13 in which said overlapping occurs on the interior of the metal channel.

* * * * *